May 29, 1951      H. F. WATERS      2,554,722
METHOD OF FORMING CYLINDRICAL CONTAINERS
Filed June 10, 1949      2 Sheets-Sheet 1
FIG. 1
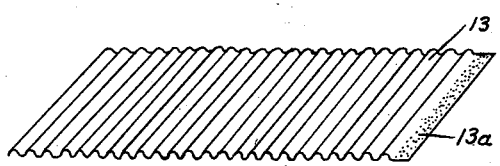
FIG. 5
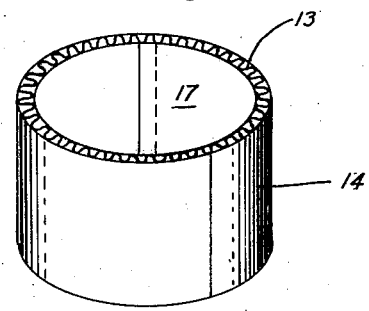
FIG. 2
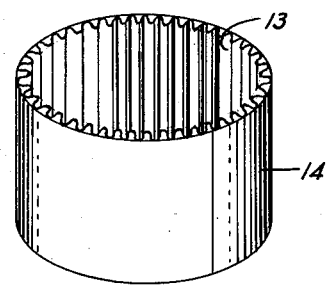
FIG. 6
FIG. 3
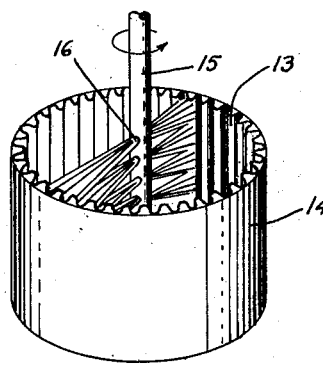
FIG. 7
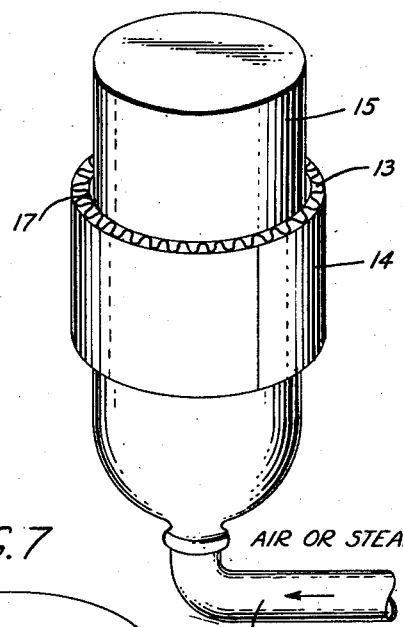
FIG. 4
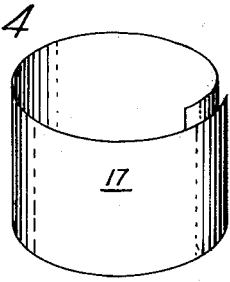
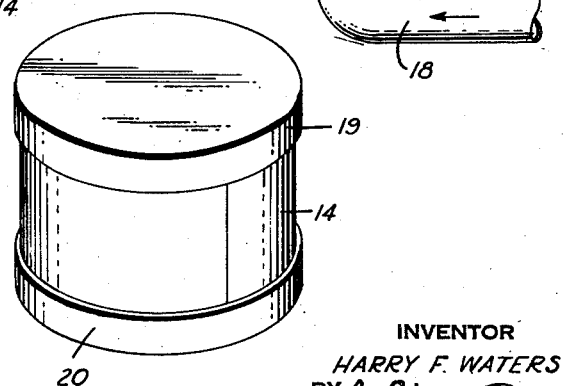
INVENTOR
HARRY F. WATERS
BY John M. Crane
ATTORNEY May 29, 1951  H. F. WATERS  2,554,722
METHOD OF FORMING CYLINDRICAL CONTAINERS
Filed June 10, 1949  2 Sheets-Sheet 2

INVENTOR
HARRY F. WATERS
BY John M. Crane
ATTORNEY

Patented May 29, 1951

2,554,722

UNITED STATES PATENT OFFICE 2,554,722

METHOD OF FORMING CYLINDRICAL CONTAINERS

Harry F. Waters, New York, N. Y.

Application June 10, 1949, Serial No. 98,361

4 Claims. (Cl. 154—83)

This invention relates to new and useful improvements in containers and more particularly to a method of forming a cylindrical container having a body member made of a plurality of plies of which one ply is a fluted ply.

The use of a fluted ply in a laminated multiple ply structure is, of course, not new with applicant. Such a fluted ply has been utilized in manufacturing corrugated cardboard sheets or boxes.

However, no one to applicant's knowledge has conceived the inventive idea of utilizing such a ply in combination with other plies to obtain a cylindrical container as set forth herein.

Heretofore cylindrical containers were either made of convoluted cardboard adhered together at its edges or were made of several laminations of material to obtain rigidity and strength. If great strength were required then many laminations were necessary and in addition large quantities of fluid and great pressures were needed to bind the material together.

Figure 8:
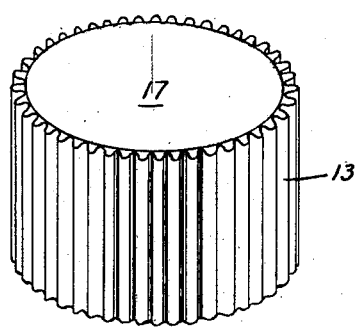
Figure 9:
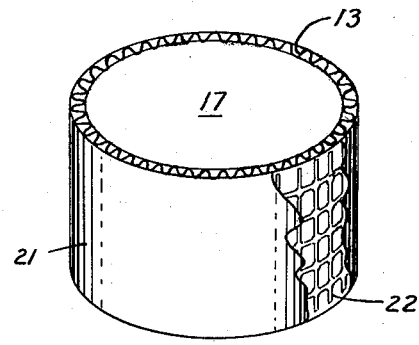
Figure 10:
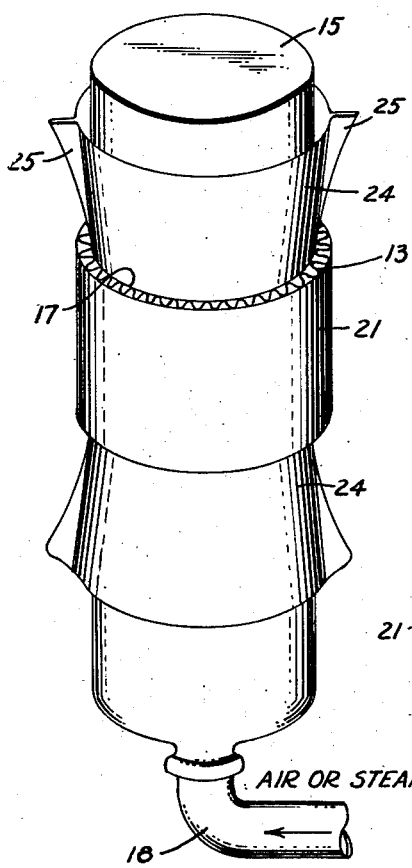
Figure 11:
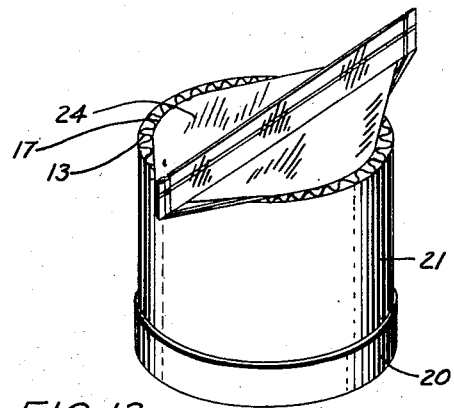
Figure 12:
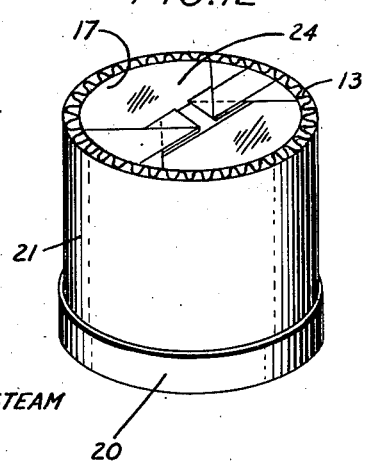

With my invention the above objects are accomplished and the difficulties of obtaining a method for the manufacture of a factory made container having a fluted ply has been overcome as will be described in the following specification when taken in connection with the accompanying drawings in which:

Fig. 1 is a perspective view of a sheet of fluted material which can either be made of very thin paper or can be made of other material; and, Fig. 2 is a perspective view of the same sheet of fluted paper with a second ply of flat sheet paper adhered together with both of them having their longitudinal edges adhered together to form a continuous wall for a tubular structure; and, Fig. 3 is a perspective view showing the method of applying adhesive to the interior of the same tubular structure shown in Fig. 2; and, Fig. 4 is a view of a piece of flat sheet material rounded into a cylindrical formation without, however, having its longitudinal edges secured or adhered together; and, Fig. 5 is a perspective view of an assembly of the structures shown in Figs. 1 and 4 with the structure shown in Fig. 4 adhered to the interior of the structure shown in Fig. 2; and, Fig. 6 shows a device for forcing the member shown in Fig. 4 against the interior of the structure shown in Fig. 2; and, Fig. 7 shows the finished container with top and bottom closures affixed thereto; and, Fig. 8 is a perspective view of the fluted structure shown in Fig. 1 with an interior ply of flat sheet material adhered thereto; and, Fig. 9 is a perspective view showing an elevational view with part broken away to demonstrate the strengthening members which may be inserted in the structure as one ply thereof; and, Fig. 10 is a perspective elevational view showing the structure of Fig. 9 with an interior liner about to be adhered thereto; and, Fig. 11 is a view of the same container structure shown in Fig. 10 with one end already folded and a closure secured thereon and the other end closure about to be closed by an off-center heating sealing closure; and, Fig. 12 is a top perspective view showing the square-folded closure of Fig. 11 completed and ready for the attachment of another top closure.

Referring now to the various figures shown in the attached drawings for the details of structure of my invention it will be seen in:

Fig. 1 that I have provided a single sheet of fluted material 13 which may be either of very thin paper, or of any thickness of paper or cardboard or other material desired. This fluted material 13 is shaped into a cylindrical formation as is shown in Fig. 2 and has then secured thereto an outer ply of flat sheet material 14. Both ends of these two plies are adhered together by adhesives or by any other standard manner. When so adhered together they form a continuous wall structure as shown in Fig. 2.

In Fig. 2 there is shown the member 13 shaped into such cylindrical formation with an outer ply 14 adhered thereto. This outer ply 14 can have its longitudinal edges secured together in overlapping relation or can have them adhered together in abutting relation.

It will be noted that both member 13 and member 14 can be shipped flat. For convenience in erecting the container one or more of the ends 13a can have moisture sensitive adhesive applied thereto. The ends of member 14 can also be similarly treated. The outer ply 14 is of a somewhat rigid but bendable material.

After these two members or plies have been so joined together and cylindrically shaped the structure is then positioned over an adhesive spraying apparatus (Fig. 3) having a rotatable spray pipe 15 with apertures 16 formed therein through which the adhesive is forced onto the interior of fluted member 13 as illustrated in Fig. 3. The structure, members 13 and 14, can be inserted over member 15 or the apparatus can be so arranged that the member 15 extends into the structure while traveling on a conveyor belt. Whether the tubular structure is inserted over the spray member or the spray member is inserted into the structure is immaterial as long as the adhesive is sprayed onto the interior of the cylindrical structure as shown in Fig. 3.

After the adhesive is thus applied I then insert a third ply member 17 (Fig. 4) which has its longitudinal edges free. This flat member 17 is placed inside of the cylindrical member (Fig. 2) and is then ready to be adhered thereto by lateral pressure.

In Fig. 6 I show the means for exerting a lateral pressure against the inner ply member 17 to cause it to adhere to the fluted member 13.

This ply is made of somewhat rigid but bendable material and is usually made of flat sheet material and can, if desired, have its longitudinal edges secured together by adhesive or by any other well known method.

After the adhesive has been properly applied to the interior of the fluted ply member 13 this flat rounded sheet material 17 is then inserted into the member structure shown in Fig. 2. The article will then be as illustrated in Fig. 5.

The article shown in Fig. 5 is then positioned over a resilient member 15. This member 15 is made of a resilient material such as rubber and is adapted to be expanded when air or steam is forced therein. The member 15 as shown has the upper end closed and the lower end formed into a nozzle into which may be inserted an air or steam pipe 18. The apparatus for forcing the air or steam into the pipe can be standard apparatus adapted to pump air or steam. It will be seen that upon the expansion of the member 15 a force is exerted laterally against the interior member shown in Fig. 4 which will cause the said member to adhere to the fluted member.

In Fig. 7 there is shown the structure of Fig. 5 after it has been removed from the air pressure apparatus shown in Fig. 6. Attached to the top and bottom of this adhered container are closures 19 and 20. These closures are held to the main body member by friction as they are made to snugly fit the body member. The structure will then be as illustrated in Fig. 7.

In Fig. 8 there is shown the fluted member 13 of Fig. 1 which however is formed into a cylinder with an interior flat ply adhered thereto according to the method heretofore described. To this structure there can be secured an exterior flat member or ply 21. In some instances it is desirable to further strengthen the cylindrical container by inserting between the plies a further ply of plastic wire, wire, or similar material such as is shown at 22, as shown in Fig. 9.

In Fig. 10 there is shown a container structure cylindrically formed of a plurality of plies of which one is a fluted ply. The structure there shown has an exterior ply formed of substantially rigid material a fluted ply and an interior ply of flat material. Prior to the insertion of the liner 24 the interior of the container structure has an adhesive applied thereto in the manner shown in Fig. 3. The container with its liner is then inserted over air pressure member 15 in the same manner as is shown in Fig. 6. After the container with its liner has been removed from the pressure apparatus there will then be left a container with a liner having slip folds formed on the circumference of the liner and as illustrated in Fig. 10 diametrically opposed to each other.

In Fig. 9 there is shown the same structure of Fig. 8 with a third and fourth ply adhered to the exterior of the structure of Fig. 8. The third ply 22 can be made of plastic wire, plastic, wire or any other similar material. The outer ply 21 is similar to ply 14 of the structure shown in Fig. 2. The structure shown in Fig. 9 or the structure shown in Fig. 8 with ply 21 adhered thereto can then have a liner 24 inserted therethrough as shown in Fig. 10. Prior to the insertion of the liner 24 the interior of ply member 17 has adhesive applied thereto in the manner shown in Fig. 3. After the adhesive has been so applied and the liner inserted therethrough the tubular structure and liner can then be inserted over a lateral pressure member 15 which is the same as the lateral pressure member 15 shown in Fig. 6. By the application of air or steam into this lateral pressure member 15 from pipe 18 the liner 24 is caused to be adhered to ply 17. This then gives a multiply ply container having a fluted ply and an interior ply whose ends extend beyond the ends of the tubular structure of which the fluted ply is a component part. This liner 24 has slip folds 25 formed longitudinally of the liner which folds, as illustrated, can be diametrically opposed to each other in order to obtain an off-center square-type closure for the top and for the bottom of the completed container. This off-center closure is disclosed in my prior Patent No. 2,374,793.

Referring to Fig. 11 it will be seen that the off-center sealing has been applied and I have illustrated one step in the closing of the liner. This liner can have a heat sensitive material applied to its interior such as a thermoplastic coated so that the ends of the liner as well as the longitudinal slip folds, if so desired, can be adhered together by heat sealing means such as disclosed in my prior application, Serial No. 595,972, filed May 26, 1945, now abandoned. In Fig. 11 it will be seen that I have provided not only a container structure made of a plurality of plies of which one is a fluted ply and another is a liner but I have also provided a closure means for the end of the container such as closure cap 20 in addition to the closing of the ends by square folding. This thus gives not only a sift-proof container but also a fluid-tight container particularly if the inner ply or liner has a thermoplastic coating on its interior.

In Fig. 12 the square-fold has been applied. In both these containers the bottom has been square-folded and a friction held closure has been fitted over the bottom ends. It will be obvious that I can now apply another friction holding closure over the top and thus obtain a container which will have its exterior resembling the container shown.

In this Fig. 12, I disclose the further steps of the folding of the extended portions of the liner. The bottom thereof has already been square-folded and the cap closure 20 has been applied thereto. This container structure is now ready for the application of a top closure which can be the same as the bottom closure 20 so that the container is closed at both ends thereof.

While I have shown and described a preferred embodiment of my invention it should be understood that I do not wish to be limited to the specific details of structure shown and described, as many modifications and variations can be made without departing from the scope of my invention. I, therefore, do not desire to be limited by the aforesaid specifications and drawings except as such limitations are necessary in accordance with the attached claims when construed and interpreted in accordance with the statutes and law governing same.

What I claim is:

1. The method of forming a fluted ply cylindrical container structure which consists of the steps of shaping a fluted sheet of material into cylindrical formation, conforming and adhering an outer ply of material thereto, applying adhesive to the interior surface of the cylindrical structure so formed, inserting a third ply into said structure, conforming said third ply to substantially cylindrical shape and then applying radial pressure to the said last named ply.

2. The method of forming a fluted ply cylindrical container structure which consists of the steps of shaping a fluted sheet of material into cylindrical formation, adhering an outer ply of material thereto, applying adhesive to the interior surface of the cylindrically formed structure, inserting a third ply into said structure, conforming said third ply to a cylindrical shape, inserting a resilient air pressure member into said structure, and then forcing air into said resilient member to cause same to expand against said last named ply.

3. The method of manufacturing a cylindrical fluted ply container structure consisting of the steps of: shaping a fluted plural ply member into cylindrical formation, applying adhesive to the interior surface of said cylindrical formation, inserting a third ply into said structure and exerting sufficient pressure against said third ply to cause same to press against said fluted ply without deforming said fluted ply.

4. The method of manufacturing a cylindrical fluted ply container structure consisting of the steps of: shaping a fluted plural ply member into cylindrical formation, applying adhesive to the interior surface of said cylindrical formation, inserting a liner into said cylinder and then applying pressure to the interior of said liner.

HARRY F. WATERS.

REFERENCES CITED

The following references are of record in the file of this patent:

UNITED STATES PATENTS

| Number | Name | Date |
| --- | --- | --- |
| 2,224,810 | Cumfer | Dec. 10, 1940 |
| 2,409,249 | Brown | Oct. 15, 1946 |
| 2,422,998 | Adams et al. | June 24, 1947 |
| 2,441,699 | Gramelspacher | May 18, 1948 |